(No Model.)
A. PULBROOK.
INFLATABLE WHEEL TIRE.
No. 553,869. Patented Feb. 4, 1896.
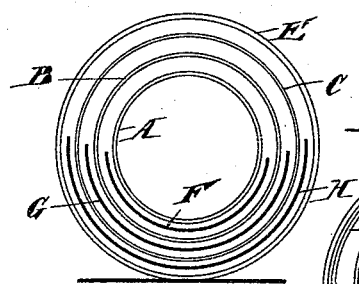
Fig. 1.
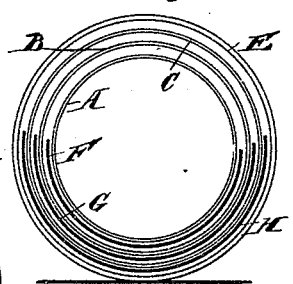
Fig. 2.
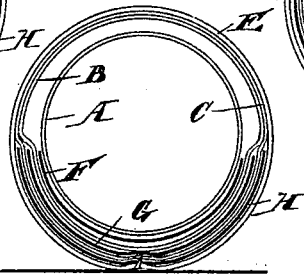
Fig. 3.
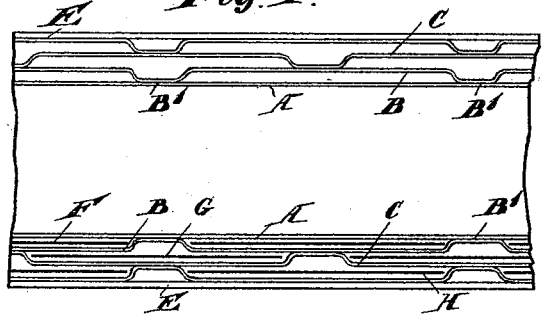
Fig. 4.
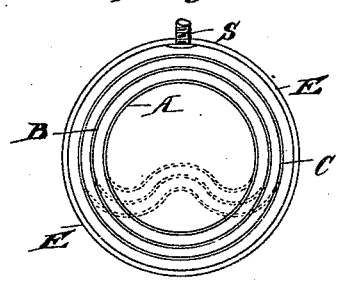
Fig. 6.
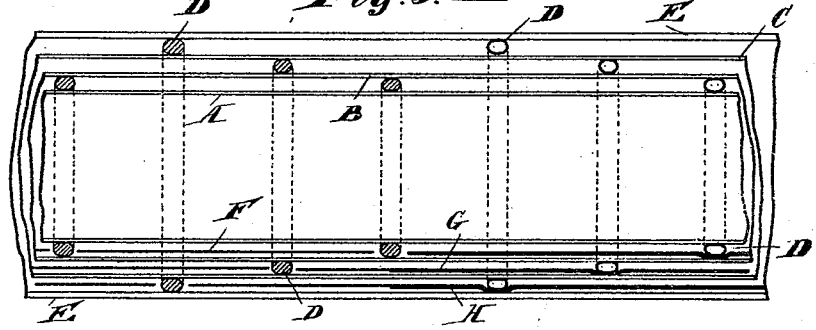
Fig. 5.
Witnesses:
H. van Oldenneel
E. A. Scott
Inventor:
Anthony Pulbrook
by 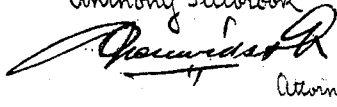
Attorneys

UNITED STATES PATENT OFFICE.

ANTHONY PULBROOK, OF LONDON, ENGLAND.

INFLATABLE WHEEL-TIRE.

SPECIFICATION forming part of Letters Patent No. 553,869, dated February 4, 1896.

Application filed November 13, 1894. Serial No. 528,704. (No model.) Patented in France April 3, 1894, No. 237,516, and in Belgium April 6, 1894, No. 109,338.

*To all whom it may concern:*

Be it known that I, ANTHONY PULBROOK, solicitor, a subject of the Queen of Great Britain, residing at 14 Victoria House, South Lambeth Road, London, in the county of Surrey, England, have invented certain Improvements in and Connected with Inflatable Wheel-Tires, (for which I have obtained patents in the following countries: France, No. 237,516, dated April 3, 1894, and Belgium, No. 109,338, dated April 6, 1894,) of which the following is a specification.

This invention relates to the inflatable wheel-tires of bicycles, tricycles, roller-skates, and other carriages, and its object is to provide improved means for preventing the puncturing and deflation of the inflatable tube.

The improved means for preventing the puncturing and deflation of the inflatable tube consist in making such tube laminated—that is to say, with several tubes inside one another—and with air-spaces between the laminations, such air-spaces being preferably divided into separate subdivisions by transverse partitions, and sometimes in such air-spaces I place bands of fishskin or skin of other water-animals, or amphibious animals, or bands of bladder, gold-beaters' skin, rawhide, tanned hide, celluloid, or other more or less unpuncturable material, or material more or less difficult to puncture, interposed between them or some of them at such parts as are likely to be punctured by sharp substances over which the wheel may pass. With this construction of inflatable tire a sharp substance—such as the point of a nail, for example—may pass through one or two of the outer tubes and bands, but as it gets nearer to the inner tube the band of more or less unpuncturable material, or the inner tube, when the same is made of more or less unpuncturable material, will yield rather than be punctured and will press the inner tube or tubes inward, thereby protecting it or them from being punctured.

I seek to form the tire as much as possible of air, avoiding all thick substances both in the tread and otherwise. As a material by itself solid india-rubber is one of the most resilient known, but a tire built up of compressed air and layers of a tough, flexible, and thin material will be lighter and more resilient, as evidenced by the extreme resilience of celluloid air-balls. I therefore make the air-tube laminated and with subdivided air-spaces, as hereinafter described.

In the accompanying drawings, Figure 1 shows a cross-section of my improved tire (the inner tubes of which are made of elastic air-tight material) before inflation; Fig. 2, a section of the same tire after inflation; Fig. 3, a section of the same tire partially perforated by a nail. Fig. 4 shows a longitudinal section of part of the same tire having the air-spaces subdivided transversely, and Fig. 5 a longitudinal section of part of the same tire having the laminations kept apart by transverse distance-pieces which likewise subdivide the air-spaces between the tubes; and Fig. 6 is a cross-section of a similar tire with the compressed air applied to it in a manner different from that described with reference to Figs. 1, 2, and 3.

I construct the air tube or tire of two or more tubes A B C, of india-rubber or other elastic air-tight material, placed one inside the other, each tube being of smaller diameter than the next outer one surrounding it, so as to leave an air-space between each two adjacent tubes or laminations. The inner tube, A, is preferably made of thinner material than the outer ones, so as to create as little resistance as possible to the pressure of the air in that tube being transmitted, as hereinafter described, to the air confined in the air-spaces between the tubes, and also to offer as little résistance as possible to any puncturing material striking the tire from the outside. The usual charging-valve (not shown in the drawings) passes through the rim of the wheel and through all the tubes and opens into the innermost tube, A. The two ends of each tube forming a lamination are connected together air-tight, so that each tube is complete and air-tight in itself and has no communication with the interior of the adjacent tube.

When air or other elastic fluid under pressure is introduced into the inner tube, A, the latter expands, as shown in Fig. 2, and compresses the air in the space between it and the next outer tube or lamination, B. The latter expands in turn and compresses the air in the space between it and the next outer tube or lamination, C, and so on for as many tubes or laminations as there may be. The inner tube or lamination, A, although made of very thin india-rubber, being supported by the surrounding laminations and the compressed air between them, will have all the strength of those surrounding laminations to enable it to withstand the pressure of the compressed air contained within it without bursting.

With a laminated tire thus formed, the effect of a blow on the outer part of the tire is to a large extent neutralized and expended before it reaches the inner tube, because each layer of compressed air acts as a cushion to receive and distribute the energy of the blow, thereby rendering the next succeeding lamination less liable to injury. Besides this, each lamination, except the outermost, being subjected to the pressure of compressed air on both sides, is more or less in equilibrium and consequently yields or gives way before pressure from outside more readily than a tube subjected to the internal pressure only of compressed air. This yielding or readiness to give way before pressure is a great preservative against puncture, because a substance can only be punctured when it offers a sufficient amount of resistance to prevent the puncturing object pushing the substance before it instead of penetrating it.

A tire thus formed solely of india-rubber would expand to a great size and would ultimately burst if the pressure were increased to a sufficient degree. Consequently it is necessary to provide an outer casing of as non-stretchable material as will keep the india-rubber within bounds and prevent it from bursting. This may be accomplished by employing a thick outer covering of india-rubber or of india-rubber and canvas, but this thick cover, while it allows for wear and tear, affects the resilience. I therefore endeavor to make the outside cover of as thin and tough material as possible, not only for the purpose of carrying out one of the fundamental principles of my invention—namely, the allowing in every possible manner for the material giving or yielding to a blow and reacting with the pressure of the compressed air—but also to afford means of bringing the most resilient part of the tire—namely, the compressed air—as near as possible to the outside tread of the tire, which not only preserves the covering from wear by virtue of its resilience but reduces vibration. Of all the material for this purpose with which I am acquainted I have found the skins of fishes or amphibious animals to be the most suitable, although I do not confine myself to this material, as I may use thin leather—such as Wamba skin, deerskin, horsehide, the grain part of pigskin, or other thick leather after the flesh part has been skived or split away.

In the drawings, E represents an outer airtight casing composed of fishskin, as above mentioned, or other suitable thin and tough and practically non-stretching material, whereby the expanding action of the compressed air is confined to the inner india-rubber tubes or laminations and has no expanding effect upon the said outer casing, E.

In a tire formed as above described after a puncturing substance has penetrated the outer skin there would be no puncture-resisting material other than the india-rubber inner tubes or laminations to withstand its puncturing action. India-rubber, when in thin sheets, especially if in a state of tension, offers but little resistance to puncture by a sharp point. I therefore preferably interpose between the india-rubber tubes or laminations, especially at the tread parts thereof, bands of more or less unpuncturable material—such as bladder, gold-beater's skin, rawhide, parchment, vellum, vegetable parchment, thin-tanned hide or skin, or split or skived hide, or layers of thin fibrous material—such as cotton, silk, hemp, and such like (such fibrous material being preferably quilted to prevent their working up into balls or sewed between two layers of thin material and then quilted) and the skins of fishes or other water-animals or amphibious animals. Such bands are shown at F, G, and H in the drawings. Being entirely free and loose, and the tubes being kept apart by the compressed air between them, and by the transverse partitions hereinafter described, the bands of more or less unpuncturable or protecting material are free to move. Consequently when a puncturing substance—such as a nail, for instance—passes through one or more of the outer bands of protecting material and outer india-rubber tubes, as shown by way of example in Fig. 3 of the drawings, it at last encounters one of these bands of protecting material, which, being loose, affords insufficient resistance to enable the puncturing substance to perforate it, but gives or yields until it reaches the india-rubber tube immediately over it. This being pushed, as it were, by a considerable surface of the protecting material, yields and the puncturing substance does not get through.

On one of the outer tubes or laminations being punctured and the compressed air between it and the next inner tube or lamination being thereby permitted to escape the said next india-rubber tube immediately expands by the action of the compressed air contained within it, and thus the air-tube still continues inflated for use until arrival at a convenient place to repair the puncture and to restore the full pressure by pumping in additional air in the usual way.

I sometimes place the more or less unpuncturable material between the surfaces of grease-proof paper or vegetable parchment, first, to prevent oil from the fish skin, when such is employed, damaging the india-rubber, and, secondly, to give smooth surfaces for the skin or other material to slide upon.

I so connect together transversely at intervals the air-tight tubes outside the inner tube that the air-tight spaces between such tubes are subdivided into sections laterally, so that in case of the puncture of an outer section the air may still remain confined in the other sections, so as to retain the original degree of resiliency of the tire in those unpunctured sections, notwithstanding the puncturing of the outer tubes of the other section or sections. This arrangement is shown in Fig. 4, in which the air-tight tube B is cemented at intervals transversely or circumferentially, as at B', to the tube A, the tube C to the tube B, and so on for any number of tubes there may be, so as to form a number of separate air-tight subdivisions or chambers between each pair of laminations, and each of these air-tight subdivisions or chambers contains, or may contain, a piece of fishskin or other material F G H difficult to puncture placed at the tread or other part of the tire which is liable to be punctured, as before explained.

The divisions of the air-tight casings transversely into separate air-tight sections or chambers may also be effected by transverse distance-pieces—such as those shown at D in Fig. 5, for example—cemented to the laminations A B C, and, if desired, to the outer casing, E, the protecting material F G H being placed, as in Fig. 4, so as to be loose and free in the air-tight sections or chambers bounded by the laminations on the one hand and the transverse distance-pieces on the other, as shown at the left-hand side of Fig. 5, or, if preferred, the distance-pieces D may be cemented only to one of the laminations or be left uncemented to either, the strips or bands of protecting material being made continuous past such distance-pieces, as shown at the right-hand side of Fig. 5, the said distance-pieces in such case serving to keep the laminations apart and to retain the protecting material in place. The transverse or distance pieces may be hollow or solid. When hollow, as shown at the right-hand side of Fig. 5, they are made of thin flexible material, and are also made air-tight, so that the air or gas inclosed therein may be compressed by the pressure of the inner tubes acting upon the outer unstretchable covering.

In the laminated tire shown in Fig. 6 the compression of the air or gas introduced into it is effected in the following manner: I first make a tube A, of india-rubber compound, gutta-percha compound, or balata compound, thin oiled silk, or other oiled or varnished textile fabric or other elastic or non-elastic material impervious to air or gas. I fill this with air, for example, at or above atmospheric pressure, and I close hermetically the aperture through which the air has been forced in air-tight, so as to retain the air in the said tube. At intervals along the tube I place distance-pieces, (such as those shown at D in Fig. 5, for example,) which have preferably a smaller internal diameter than the tube A when the latter is inflated. I then inclose the aforesaid tube A, with its distance-pieces, within another tube, B, made of similar material, and similarly fill the space between the two tubes with air at or above atmospheric pressure, and I place over this second tube other distance-pieces similar to those round the first tube. Over this second tube, B, I sometimes place a third tube, C, which I similarly fill with air, with other distance-pieces outside it, and so on to any required number of tubes. Then outside all I place a tube or cover E, made of non-stretchable material which is impervious to air or gas. This outer tube or cover, E, is provided with an air-inlet or charging valve S of the usual character.

On forcing air under pressure through the said valve S into the said outside tube or cover, E, that pressure is communicated to the air in all the interior tubes, and these tubes, being thin and flexible, give way before the pressure, are more or less collapsed thereby, as shown by dotted lines in the figure, and are kept away clear of the range of puncturing material. In the event of the outside tube or cover containing air under pressure being punctured, the air in the internal tube or tubes expands and restores the said tube or tubes to its or their normal conditions, and the tire consequently still remains inflated to a certain extent and can be used until a convenient point is reached for repairing the puncture in the outer tube or cover. By the compression of the air inward against the outer walls of the inner tubes the said walls, being subjected to the same pressure of air on both sides, offer little or no resistance, and not being in a state of tension are less liable to puncture than tubes subjected to an unbalanced internal pressure.

Strips of more or less non-puncturable material, F G H, may be placed in the air-spaces between the tubes A, B, C, and E for the same purposes as those described in reference to Figs. 1 to 5.

I claim as my invention—

1. In combination in an inflatable wheel-tire, two or more air-tight tubes placed inside one another, the external diameter of each internal tube being less than the internal diameter of the tube surrounding it, so as to leave air-spaces between the tubes, and transverse partitions placed at intervals in the air-spaces, for holding the said tubes apart and for subdividing the air-spaces between them, substantially as described.

2. In combination in an inflatable wheel-tire, two or more air-tight tubes placed inside one another, the external diameter of each internal tube being less than the internal diameter of the tube surrounding it, so as to leave air-spaces between the tubes and transverse air-tight hollow partitions placed at intervals in the air-spaces for holding the said tubes apart, and for subdividing the air-spaces between them substantially as described.

3. In combination in an inflatable wheel-tire, two or more air-tight tubes placed inside one another, the external diameter of each internal tube being less than the internal diameter of the tube surrounding it, so as to leave air-spaces between the tubes, transverse partitions at intervals in the air-spaces for holding the said tubes apart and for subdividing the air-spaces between them, and flexible material which is more or less non-puncturable or more or less difficult to puncture interposed in the air-spaces or in some of them, substantially as described.

In witness whereof I have hereunto set my hand in presence of two witnesses.

ANTHONY PULBROOK.

Witnesses:
STEPHEN EDWARD GUNYON,
WILLIAM ANDERSON SMITH.